Patented Nov. 14, 1950

2,529,840

UNITED STATES PATENT OFFICE 2,529,840

BIS-SUBSTITUTED CHLORODIAZINES AND METHODS OF PREPARATION THEREOF

Richard Paul Germann, Plainfield, N. J., assignor to American Cyanamid Company, New York, N. Y., a corporation of Maine No Drawing. Application July 26, 1947,
Serial No. 764,015

14 Claims. (Cl. 260—256.5)

This invention relates to certain new organic compounds which have been found to have surprising utility for therapeutic purposes and to methods of preparing these compounds and known compounds from my new compounds. More particularly, and for example, the compounds may be of the type of bis-(3-aminophenylsulfonyl)-2-amino-5-halopyrimidine, intermediates, and compounds related thereto, particularly those having a 3 substituent readily convertible to the amino group.

It is believed that the compounds prepared in accordance with my invention have both of the 3-aminophenylsulfonyl groups, or 3-nitro-phenylsulfonyl groups attached to a nitrogen or nitrogens, but it is not certain whether it is a ring nitrogen or the amino nitrogen of the 2-amino-5-chloropyrimidine, or one on each. It may be that the true chemical structure is a tautomer of these two compounds, as the chemical properties show that if one of the aminophenylsulfonyl radicals is removed, the one remaining is always on the amino hydrogen. This property is compatible either with the theory that both of the aminophenylsulfonyl groups are attached to this nitrogen or that the group attached to the ring nitrogen is so much more active that it is invariably removed or that the compound is tautomeric and that the group shifts during reactions involving the compound. Groups of this size are not often shifted tautomerically, and it is not intended to predicate the invention upon a theory of structure.

These new compounds are useful both as dye intermediates and as therapeutic agents. They are also useful as a starting material for the preparation of metanilamidodiazine which compound is disclosed and the properties of which are shown to be most useful in the applications of English and Clark, "Metanilamidodiazines and Method of Preparing Same," Serial No. 577,946. Metanilamidohalodiazines may be prepared by using my new compounds as intermediates and are useful as therapeutic agents. When particularly the 5-chloropyrimidine nucleus is used, the compounds are found to have certain desirable activity against some of the malarias. Because of the ease and cheapness with which certain of these compounds may be prepared, the convenience of their use and utility in overcoming the malaria menace is obvious. The composition of the compounds of my invention, depending upon the position of the substituents, which can only be postulated, is in accordance with the formulas:

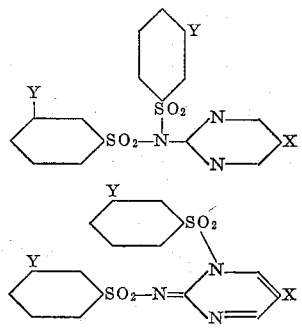
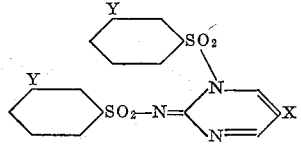

where X is a halogen, and where Y is an amino group or a group readily convertible to an amino group. Where Y is an amino group, the compounds can be named 2[bis(3-aminophenylsulfonyl)-2-amino] - 5 - halopyrimidine and 1-(3-aminophenylsulfonyl)-2-(3 - aminosulfonimido) - 5-halo-1,2-dihydropyrimidine.

The compounds may be prepared by the reaction of a meta substituted benzenesulfonylhalide with 2-amino-5-halopyrimidine in a suitable solvent. For good yields, the acid halide used should be present in at least the theoretical proportions of two moles per mole of the amino pyrimidine. In accordance with well known principles, an increase in the ratio of acid halide present to greater than the theoretical two to one will decrease the proportion of mono substituted product formed. The meta substituent on the benzene ring should be one which is easily and readily convertible to an amino group. There are a large number of radicals which meet this requirement, but from the standpoint of convenience and price among the most desirable are nitro groups and acylamino groups. The nitro group may be reduced to the amino, and the acylamino may be hydrolyzed to the amino group. Among other substituents which may be used, but which normally are less useful because of their cost, are such radicals as the azo, azide, imide, alkylamino, arylamino, azomethine, ureido, or the like. The reaction may be conducted in the presence of a solvent such as pyridine or the like.

The reaction sets free a hydrogen halide, and for best results, this product must be removed. An acid binding or basic substance is needed. It is found convenient to use a basic solvent such as pyridine, picoline, or triethylamine, which themselves combine with and effectively bind the acid produced.

The temperature may be from about 0° to about 100° C. Lower temperatures tend to give better yields. The time required to bring about the coupling of the sulfonylhalide and diazine depends upon the temperature of the mixture. The shorter the time the higher the temperature required. The times and temperatures given in the examples vary with the particular substituents therein used.

The meta substituent groups may be converted to amino groups after the formation of the bis compound, if desired. These bis compounds are found to have desirable pharmaceutical properties. The bis metanilamido-5-chloropyrimidine is a valuable antimalarial. The corresponding bis (3-nitro) compound also has therapeutic properties. It may be that the 3-nitro is reduced to 3-amino in the body. The bis(3-amino) compound prevents malaria in chicks and acts as a causal prophylactic. The compound is much more active under certain test conditions than sulfadiazine. Similar useful properties are possessed by the 3-aminophenylsulfonyl-2-amino-5-chloropyrimidine. The bis (3-nitro) product may be converted to a 2-metanitrobenzenesulfonamido-5-chloropyrimidine as in Example III, or by cleavage by either an acid or a basic solution. The nitro compound may be reduced to the 2-metanilamido-5-chloropyrimidine.

From the standpoint of plant operation and convenience it is frequently desirable to form the bis compound, purify the compound in this form and then convert to the mono compound. Better yields and purer products are more cheaply obtained in many instances. The meta substituent on the ring may be converted to the amino before or after the reaction to form the mono or the bis compound. It is a matter of choice depending upon available equipment, and also upon the meta substituent. Certain alternatives are shown specifically in the examples below. Other obvious modifications will immediately suggest themselves to those skilled in the art.

Bromine or other halides may be used in this reaction, either on the sulfonyl group or the pyrimidine nucleus.

The invention will now be described in detail by means of certain specific examples which show certain representative embodiments of my invention. It is not intended that all embodiments be fully set forth by example nor that all reactants or conditions which are operable be included, as such would unduly complicate the number of examples, and the true breadth of my invention would be obscured by the detail.

EXAMPLE I

*Bis(3-nitrophenylsulfonyl)-2-amino-5-chloropyrimidine*

Twenty grams of meta-nitrobenzenesulfonyl chloride, 5.9 grams of 2-amino-5-chloropyrimidine and 15 cc. pyridine were stirred together at a temperature not exceeding 30° C. for 6 or 8 hours. At the end of this time, 45 cc. of water was added, the mixture stirred, heated to 100° C., cooled, filtered and washed with water. The precipitate was slurried at 80° C. in water solution and adjusted to a pH of about 8.5 with sodium hydroxide. The portion which did not go into solution was filtered, washed and dried. A yield of 34.2% of crude material was obtained with a melting point of 195–214° C. The crude caustic insoluble portion was dissolved in boiling glacial acetic acid, recrystallized therefrom twice, washed and dried. The purified crystalline solid has a melting point of 223.5–225.5° C. It is practically insoluble in all customary organic solvents except glacial acetic acid. The theoretical analysis as compared with analysis of the product found is:

|  | Calculated for $C_{16}H_{10}N_5O_8S_2Cl$ | Found |
| --- | --- | --- |
|  | *Per cent* | *Per cent* |
| Carbon | 38.5 | 38.6 |
| Hydrogen | 2.0 | 2.0 |
| Nitrogen | 14.1 | 14.0 |
| Sulphur | 12.8 | 12.9 |
| Chlorine | 17.1 | 17.25 |

EXAMPLE II 119 parts of metanitrobenzenesulfonyl chloride, 58 parts 2-aminochloropyrimidine and 89 parts pyridine were heated together with stirring at 55–65° C. for 8 hours. At the end of this time 270 parts water were added and the temperature increased to 100° C. for ten minutes. The mixture was cooled, filtered and washed with water. The precipitate was slurried at 60° C. in a water solution and adjusted to a pH of about 8.5 with sodium hydroxide. The portion which did not go into solution was filtered, washed and dried. At the temperature used the solution contained 41.3 parts (26.4%) of 2(3-nitrophenylsulfonamido)-5-chloropyrimidine. The bis product, the insoluble portion, was 65 parts. This is a yield of 29% of bis(3-nitrophenylsulfonyl)-2-amino-5-chloropyrimidine. The higher temperature used accounts for the comparatively high yield of the side product, or mono substituted product, as compared with the desired, or bis product.

EXAMPLE III

*2(3-nitrophenylsulfonamido)-5-chloropyrimidine*

Ten grams of bis(3-nitrophenylsulfonyl)-2-amino-5-chloropyrimidine, 2.6 grams of 2-amino-5-chloropyrimidine and 20 cc. of pyridine were heated together on a steam bath at 95° C. for two and a half hours. The solution was drowned in 120 cc. of water. The drowned mixture was heated to 95° C. for 15 minutes, allowed to cool, and solid form filtered out. The solid was added to 75 cc. water, sodium hydroxide added to a pH of 8.5, the solution filtered, the filtrate acidified to a pH of 4 with acetic acid. The cream colored precipitate thus formed was filtered, washed and dried. A yield of 9.1 grams (72.2%) of 2(3-nitrophenylsulfonamido)-5-chloro-pyrimidine was obtained of a melting point 231–232° C. When recrystallized, the melting point was 235–238.5° C.

EXAMPLE IV

*Bis(3-aminophenylsulfonyl)-2-amino-5-chloropyrimidine*

A mixture of 5 parts of bis(3-nitrophenylsulfonyl)-2-amino-5-chloropyrimidine, 10 parts glacial acetic acid and 1 part Raney nickel was placed in an autoclave; hydrogen was added to a pressure of 1500 lbs. per square inch. The autoclave was heated for 3 hours at 100° C. until the hydrogenation was completed as indicated by the pressure drop. The Raney nickel and product were filtered off, the product dissolved in pyridine, treated with activated charcoal, filtered and precipitated by adding to three times its volume of water. The purification was repeated three times giving a practically colorless crystalline product which melts with decomposition at over 200° C. The compound is bis(3-aminophenylsulfonyl)-2-amino-5-chloropyrimidine. A yield of 68.9% of theoretical was obtained.

The analysis, compared with the theoretical is

| | Calculated for $C_{16}H_{14}N_5O_4S_2Cl$ | Found |
|---|---|---|
| Carbon_____per cent | 43.9 | 44.0 |
| Hydrogen_____do____ | 3.2 | 3.2 |
| Nitrogen_____do____ | 15.9 | 15.96 |
| Sulphur_____do____ | 14.5 | 14.5 |
| Chlorine_____do____ | 8.0 | 7.98 |
| Equivalent weight by Nitrite titration_____ | 220 | 220 |

I claim:

1. Bis(3-Y phenylsulfonyl)2-amino-5-halopyrimidine where Y represents a radical selected from the group consisting of free amino, radicals which are convertible to free amino by hydrolysis, and radicals which are convertible to free amino by reduction.

2. Bis(3-nitrophenylsulfonyl)-2-amino-5-halopyrimidines.

3. Bis(3-aminophenylsulfonyl)-2-amino-5-halopyrimidines.

4. Bis(3-nitrophenylsulfonyl)-2-amino-5-chloropyrimidine.

5. Bis(3-aminophenylsulfonyl)-2-amino-5-chloropyrimidine.

6. Bis(3-aminophenylsulfonyl)-2-amino-5-bromopyrimidine.

7. A method of preparing a bis-(3-aminophenylsulfonyl)-2-amino-5-halopyrimidine which comprises reacting together approximately 1 mol of 2-amino-5-halopyrimidine and 2 mols of a meta-Z-phenylsulfonyl halide where Z is a radical selected from the group consisting of free amino radicals, radicals which are convertible to free amino by hydrolysis, and radicals which are convertible to free amino by reduction, in the presence of a solvent, recovering the resultant bispyrimidine compound, and converting the Z radical to an amino group.

8. The process of preparing a bis substituted 2-amino-5-halopyrimidine which comprises reacting together a meta substituted phenylsulfonylhalide, wherein the meta substituent is selected from the group consisting of free amino, radicals which are convertible to free amino by hydrolysis, and radicals which are convertible to free amino by reduction, and a 2-amino-5-halopyrimidine in the presence of a basic solvent.

9. A method of preparing bis(3-nitrophenylsulfonyl)-2-amino-5-halopyrimidines which comprises mixing together and reacting a metanitrophenylsulfonylhalide with a 2-amino-5-halopyrimidine.

10. The process of preparing a bis substituted 2-amino-5-chloropyrimidine which comprises reacting together a meta substituted phenylsulfonylchloride wherein the meta substituent is selected from the group consisting of free amino, radicals which are convertible to free amino by hydrolysis, and radicals which are convertible to free amino by reduction and 2-amino-5-chloropyrimidine in the presence of a basic solvent.

11. A method of preparing bis(3-nitrophenylsulfonyl)-2-amino-5-chloropyrimidine which comprises mixing together and reacting meta-nitrophenylsulfonylchloride with 2-amino-5-chloropyrimidine.

12. A method of preparing bis-(3-nitrophenylsulfonyl)-2-amino-5-chloropyrimidine which comprises mixing together approximately 2 mols of meta-nitrophenylsulfonyl chloride and one mol of 2-amino-5-chloropyrimidine at a temperature not exceeding 65° C. in a basic solvent and recovering the bis-(3-nitrophenylsulfonyl)-2-amino-5-chloropyrimidine.

13. In the process of preparing a bis substituted 2-amino-5-halopyrimidine, the step which comprises reacting together a compound of the formula

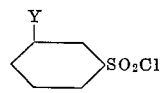

where Y represents a radical selected from the group consisting of free amino, radicals which are convertible to free amino by hydrolysis, and radicals which are convertible to free amino by reduction, and a 2-amino-5-halopyrimidine.

14. A method of preparing bis-(3-aminophenylsulfonyl)-2-amino-5-chloropyrimidine which comprises mixing together approximately 1 mol of 2-amino-5-chloropyrimidine and 2 mols of meta-nitrobenzenesulfonyl chloride at a temperature not exceeding 65° C. in pyridine, recovering the thus formed bis-(3-nitrophenylsulfonyl)-2-amino-5-chloropyrimidine, reducing it in the presence of glacial acetic acid with a catalyst and hydrogen, and recovering the thus formed bis-(3-aminophenylsulfonyl)-2-amino-5-chloropyrimidine.

RICHARD PAUL GERMANN.

REFERENCES CITED

The following references are of record in the file of this patent:

UNITED STATES PATENTS

| Number | Name | Date |
|---|---|---|
| 2,322,974 | Salomon | June 29, 1943 |
| 2,429,184 | Hartmann et al. | Oct. 14, 1947 |

OTHER REFERENCES

Raiziss et al., J. Am. Chem. Soc., 63, 3124–3126 (1941).

Hartmann et al., Helv. Chim. Acta, 24, 1249–1250 (1941).

Chemical Abstracts, 40, 4691 (1946).

Krems et al., Chem. Rev., 40, 343–347 (1947).